United States Patent [19]
Dave et al.

[11] Patent Number: 5,135,761
[45] Date of Patent: Aug. 4, 1992

[54] COATED CHEWING GUM PRODUCT WITH EMULSIFIER SUBCOAT

[75] Inventors: Jayant C. Dave, Bloomingdale; Ulesses P. Orr, Chicago; Albert H. Chapdelaine, Naperville, all of Ill.

[73] Assignee: Wm. Wrigley Jr. Company, Chicago, Ill.

[21] Appl. No.: 676,832

[22] Filed: Mar. 28, 1991

[51] Int. Cl.$^5$ ............................................. A23G 3/30
[52] U.S. Cl. ........................................ 426/5; 426/103; 426/99; 426/305; 426/307; 426/662
[58] Field of Search ................. 426/5, 103, 99, 305, 426/307, 662

[56] References Cited

U.S. PATENT DOCUMENTS

| | | | |
|---|---|---|---|
| 2,304,246 | 12/1942 | Ekert | 426/5 |
| 3,456,050 | 7/1969 | Rieckmann | 426/5 |
| 3,622,352 | 11/1971 | Daylor | 426/5 |
| 4,105,801 | 8/1978 | Dogliotti | 426/3 |
| 4,238,510 | 12/1980 | Cherukuri et al. | 426/5 |
| 4,250,195 | 2/1981 | Cherukuri et al. | 426/5 |
| 4,317,838 | 3/1982 | Cherukuri et al. | 426/5 |
| 4,464,411 | 8/1984 | Herzing et al. | 426/3 |
| 4,681,766 | 7/1987 | Huzinec et al. | 426/5 |
| 4,753,790 | 6/1988 | Silva et al. | 426/5 |
| 4,786,491 | 11/1988 | Patel | 426/5 |
| 4,792,453 | 12/1988 | Reed et al. | 426/3 |
| 4,802,924 | 2/1989 | Woznicki et al. | 426/3 |
| 4,828,845 | 5/1989 | Zamudio-Tena | 426/5 |
| 4,840,797 | 6/1989 | Boursier | 426/5 |
| 4,904,482 | 2/1990 | Patel et al. | 426/3 |
| 4,952,407 | 8/1990 | Record et al. | 426/3 |
| 4,986,991 | 1/1991 | Yatka et al. | 426/3 |
| 5,041,293 | 8/1991 | Patel et al. | 426/3 |

FOREIGN PATENT DOCUMENTS 0227603 7/1987 European Pat. Off. .

OTHER PUBLICATIONS

Silesia Confiserie Manual No. 2, Special Handbook for Dragee Production, (1973) pp. 369, 385-390, 480.

*Primary Examiner*—Jeanette Hunter
*Attorney, Agent, or Firm*—Willian Brinks Olds Hofer Gilson & Lione

[57] ABSTRACT

A coated chewing gum product with an emulsifier subcoat and method of producing the same are disclosed. Chewing gum centers are coated first by an emulsifier, preferably hydrated lecithin, and then by a hard coating, such as a sugar coating applied by conventional hard-panning techniques. Preferably a binder layer, such as gum arabic, is provided between the emulsifier subcoat and the hard-panned coating.

20 Claims, No Drawings

COATED CHEWING GUM PRODUCT WITH EMULSIFIER SUBCOAT

BACKGROUND OF THE INVENTION

The present invention relates to coated chewing gum products, and more particularly to products that have a chewing gum center, a hard outer coating and an emulsifier used as a subcoat layer to provide softening of the gum after it has been coated.

Chewing gum formulas are manufactured to have a dough-like consistency. Depending on the formula, the gum may be soft or hard. Generally, sugar-type formulations with base, sugar, syrup and flavor have a hard gum consistency. A softener and/or humectant like glycerin is added to give a softer consistency. Other softeners like propylene glycol may also be added. The use of a high moisture syrup may also give a softer gum product. The gum base itself may also be softened, which will also give a softer gum consistency. There are a number of ways to soften gum consistency and these methods have been developed in the past to make stick chewing gum and soft bubble gum products that are very consumer acceptable.

Soft gum, however, if pelletized to make a coated chewing gum product, is not acceptable for coating operations that produce a hard shell. This process is called "hard panning", a well known procedure of applying syrups (generally sugar syrups) to gum centers in repeated coats, drying the syrup after each coat. Hard gum centers are needed to withstand the vigorous treatment during the coating operation, otherwise the gum pieces deform during the panning process and are not commercially acceptable. Generally, gum centers for coating are formulated to be harder than gum used to make chewing gum sticks or bubble gum. Unfortunately, the hard gum centers do not develop as soft of a chew as a softer gum product, and are thus less preferred by most consumers.

There are several patents that disclose a variety of sugar and sugarless coatings for chewing gum and other comestibles. For example, U.S. Pat. No. 4,238,510 to Cherukuri et al. discloses a sugarless coating containing sorbitol in crystalline form. The process uses a "soft panning" technique, where a dusting mix of powdered sweetener is added to help absorb moisture in the coating syrup. Binding components and film forming components are included in the coating syrup. Anti-sticking components and moisture absorbing components are included in the dusting mix.

U.S. Pat. No. 4,250,195 to Cherukuri et al. discloses a method of applying a soft flexible sugar coating to fresh chewing gum. A "soft panning" technique is used, wherein a dusting mix is applied to the gum centers after the first coating syrup is applied. Although the gum is coated while it is soft, the coating is also soft, though gum arabic in the coating is said to ensure that the coating hardens after four weeks.

U.S. Pat. No. 4,753,790 to Silva et al. discloses a sorbitol coated comestible such a chewing gum. The coating solution comprises a saturated sorbitol solution, crystalline sorbitol powder, one or more film forming agents and one or more crystallization retardants. Optionally the coating solution includes binders, plasticizers and moisture absorbents.

U.S. Pat. No. 4,828,845 to Zamudio-Tena et al. discloses a xylitol coated comestible such as chewing gum. This patent discloses the use of film forming agents, binders and optional fillers and plasticizers in the coating syrups.

U.S. Pat. No. 4,802,924 to Woznicki et al. discloses a polydextrose-based coating material for, inter alia, chewing gum. The coating solution includes a detackifier such as lecithin or mineral oil.

U.S. Pat. No. 4,105,801 to Dogliotti discloses a coated edible product wherein the shell is formed of an intimate mixture of microcrystals of xylitol and a normally solid fatty substance. The fatty substance, such as cocoa butter, prevents the xylitol coating from transforming from a smooth shell to a cracked, rough structure. If the fatty substance is not itself an emulsifier, an emulsifier is optionally added to the coating. The coating may be applied to chewing gum.

While these various patents disclose a variety of coating syrups or other coating compositions, none addresses the problem that a gum that is sufficiently hard for hard panning is not sufficiently soft for consumers who desire soft gum products. Also, many of the patents use a soft coating, while a hard coating is often more desirable.

In current commercial production, the problem is approached in two different ways. In one approach, gum pieces are allowed to sit for several days and "condition" prior to coating. While this conditioning hardens the gum, it usually does so by drying the gum out. After the gum is coated, and later chewed, it does not regain the desired softness. Also, storage space is required while conditioning the gum pieces.

In a second approach, the gum centers are cooled by refrigeration prior to panning. The resulting gum pieces are harder due to a lowered temperature. The approach has the drawback that it requires expensive refrigeration equipment. Also, it has limited success because the panning procedure quickly heats the gum pieces back up to panning temperature.

Thus, a need exists for an economical process for making a coated gum product which provides a soft gum during chewing but is sufficiently hard to be coated by rigorous hard panning.

SUMMARY OF THE INVENTION

A coated chewing gum product has been developed that includes a chewing gum center, a coating of an emulsifier covering the gum center, and a hard-panned coating covering the emulsifier coating. After the hard-panned coating is applied, and primarily during chewing, the emulsifier from the subcoat softens the gum center.

The invention uniquely provides a gum piece with a hard texture for coating, as well as soft texture for chewing. Conventional panning equipment and procedures can be used, without the need for expensive refrigeration equipment. These and other benefits of the invention will best be understood in light of the following detailed description of the invention.

DETAILED DESCRIPTION OF THE INVENTION

As used herein, the term chewing gum includes bubble gum and other like variants of chewing gum. Unless specified otherwise, all percentages are based on weight.

Gum compositions that may be used to make the chewing gum centers of the present invention are conventional, although as noted above, the gum center should have a consistency hard enough for hard panning operations.

In general, a chewing gum composition typically comprises a water-soluble bulk portion, a water-insoluble chewable gum base portion and typically water-insoluble flavoring agents. The water-soluble portion dissipates with a portion of the flavoring agent over a period of time during chewing. The gum base portion is retained in the mouth throughout the chew.

The insoluble gum base generally comprises elastomers, resins, fats and oils, waxes, softeners and inorganic fillers. Elastomers may include polyisobutylene, isobutylene-isoprene copolymer and styrene butadiene rubber, as well as natural latexes such as chicle. Resins include polyvinyl acetate and terpene resins. Fats and oils may also be included in the gum base, including tallow, hydrogenated and partially hydrogenated vegetable oils, and cocoa butter. Commonly employed waxes include paraffin, microcrystalline and natural waxes such as beeswax and carnauba. According to the preferred embodiment of the present invention, the insoluble gum base constitutes between about 5 to about 80 percent by weight of the gum center. More preferably the insoluble gum base comprises between 10 and 60 percent by weight of the gum center, and most preferably about 20 to about 35 percent by weight of the gum center.

The gum base typically also includes a filler component. The filler component may be calcium carbonate, magnesium carbonate, talc, dicalcium phosphate or the like. The filler may constitute between about 5 and about 60 percent by weight of the gum base. Preferably, the filler comprises about 5 to about 50 percent by weight of the gum base.

Gum bases typically also contain softeners, including glycerol monostearate and glycerol triacetate. Further, gum bases may also contain optional ingredients such as antioxidants, colors, and emulsifiers. The present invention contemplates employing any commercially acceptable gum base that will provide a gum center hard enough for hard panning.

The water-soluble portion of the chewing gum center may further comprise sweeteners, softeners, flavoring agents and combinations thereof. The sweeteners often fulfill the roll of bulking agents in the gum. The sweeteners may be sugarless sweeteners such as sorbitol, mannitol, xylitol, hydrogenated starch hydrolysates, maltitol and the like, alone or in any combination. In sugar gums, typical bulking agents include sucrose, dextrose, maltose, dextrin, dried invert sugar, fructose, levulose, galactose, corn syrup solids and the like, alone or in combination. The bulking agent generally will comprise from about 5 percent to about 80 percent of the gum composition, and more preferably about 20 percent to about 70 percent of the gum composition.

Softeners are added to the chewing gum composition in order to optimize the chewability and mouth feel of the gum. Softeners, also known in the art as plasticizers or plasticizing agents, generally constitute between about 0.5 to about 15.0 percent by weight of the chewing gum. Softeners contemplated by the present invention include glycerin, lecithin, and combinations thereof. Further, aqueous sweetener solutions such as those containing sorbitol, hydrogenated starch hydrolysates, corn syrup and combinations thereof may be used as softeners and binding agents in gum. In the gum centers of the present invention, such softeners are used at levels such that the gum center is hard enough to be hard panned without significant deformation.

A flavoring agent may be present in the chewing gum center in an amount within the range of from about 0.1 to about 10.0 weight percent, and preferably from about 0.5 to about 3.0 weight percent, of the gum composition. The flavoring agents may comprise essential oils, synthetic flavors, or mixture thereof including, but not limited to, oils derived from plants and fruits such as citrus oils, fruit essences, peppermint oil, spearmint oil, clove oil, oil of wintergreen, anise, and the like. Artificial flavoring components are also contemplated for use in gums of the present invention. Those skilled in the art will recognize that natural and artificial flavoring agents may be combined in any sensorially acceptable blend. All such flavors and flavor blends are contemplated by the present invention.

Optional ingredients such as colors, high-potency sweeteners and pharmaceutical agents may be added to the chewing gum used to make the gum center.

In general, chewing gum is manufactured by sequentially adding the various chewing gum ingredients to a commercially available mixer known in the art. After the ingredients have been thoroughly mixed, the gum mass is discharged from the mixer and shaped into the desired form, such as by rolling into sheets and cutting into chewing gum centers, forming into balls or casting into pellets.

Generally, the ingredients are mixed by first melting the gum base and adding it to the running mixer. The base may also be melted in the mixer itself. Color or emulsifiers may also be added at this time, along with a portion of the bulking agent. Further portions of the bulking agent may then be added to the mixer. A flavoring agent is typically added with the final portion of the bulking agent.

The entire mixing procedure typically takes from five to fifteen minutes, but longer mixing times may sometimes be required. Those skilled in the art will recognize that many variations of the above described procedure may be followed.

After gum is sheeted and broken into individual pellets, the pellets may be coated in conventional panning equipment. Preferably, the first coat applied is the emulsifier. For ease of application, the emulsifier will preferably be hydrated so that it can be applied as a liquid or as a fluid gel. The preferred emulsifiers are those which can be hydrated, such as lecithin; mono- and diglycerides; glyceryl lacto palmitate; sorbitan monostearate; triglycerol monostearate; triglycerol monoshortening; octaglycerol monooleate; polysorbates 65, 60 and 80; and mixtures thereof. The preferred emulsifiers are hydrated by mixing them with water in a ratio of about 3:1 to about 1:3 emulsifier and water. The preferred hydrated emulsifier is a 2:1 ratio of powdered lecithin to water. Conceivably, the water used in the hydration, if not completely removed during subsequent steps of forming the coating, will add to the of the gum, as disclosed in U.S. Pat. No. 4,904,482, incorporated herein by reference.

In the final gum product, the emulsifier comprises about 0.05% to about 2.5%, and preferably about 0.1% to about 1%, of the total weight of the coated gum product.

The emulsifier in a flowable form is added to pellets in a conventional coating pan. An aqueous dispersion of emulsifier allows the material to be evenly distributed on the pellets. Preferably a hydrated emulsifier gel coating is dried with a powdered bulk sweetener or dusting agent, such as sugar. Such a powdered material is applied as in a soft panning technique, as is well known in the art. The emulsifier may be added in one application or several applications, depending on the quantity to be added. The powdered bulk sweetener or dusting agent is preferably added after each application of emulsifier.

The bulk sweetener used will contribute some sweetness as part of the coating. Preferably the bulk sweetener will be the same as the sweetener employed in the final hard coating process. The bulk sweetener will preferably be sucrose, but other bulk sweeteners such as dextrose, sorbitol, xylitol, mannitol and hydrogenated isomaltulose (Palatinit ®) may be used.

The dusting mix may include a filler, such as talc, calcium carbonate, starch and other moisture absorbing agents, and may include natural gums, including gum arabic, cellulose gums and mixtures thereof.

After the desired quantity of emulsifier is built up on the gum centers and is dried, a binder/film forming agent is preferably applied to cover the emulsifier-coated gum center. The binder/film forming agent will preferably be applied in solution form. Suitable binders include gum arabic, maltodextrin, dextrin, modified starch, gelatin and mixtures thereof, with a 30-40% solution of gum arabic being preferred. The binder solution is preferably dried with more powdered bulk sweetener additions. The binder will generally be applied at a level of about 0.1% to about 1% of the total product, and preferably about 0.3%.

Attempts to coat the emulsifier-coated pellets with a sweetener solution without a binder treatment may not be successful, as the coating solution may not stick to the emulsifier-coated gum centers. However, after a covering coat of gum arabic is used, hard panning can be done without difficulty. Alternatively, if the dusting mix applied after the emulsifier contains gum arabic, maltodextrin or other binding agents, the additional step of coating the emulsifier-coated gum center with a solution of binder may be unnecessary.

The hard coating is preferably applied by conventional hard panning techniques, well known in the art. For example, *Silesia Confiserie Manual #2, Special Handbook for Dragee Production* provides information on panning procedures and materials. The hard coating may be formed primarily of a bulk sweetener such as sucrose, dextrose, sorbitol, xylitol or hydrogenated isomaltulose (Palatinit ®), with sugar being preferred. The coating syrup may include a film forming agent, such as gum arabic. The hard coating will normally comprise about 20% to about 50%, and preferably about 30% to about 40%, of the product.

Pellets that are coated by this method are sufficiently hard for sugar coating without problems, but during chewing, the emulsifier becomes intimately mixed with the gum portion and softens the gum center to be acceptable to consumers. While it is uncertain, it is possible that some of the gum center absorbs the emulsifier subcoat during storage to begin the softening process.

EXAMPLES 1 AND 2

The following gum formula was made:

| | % |
|---|---|
| Base | 25.1 |
| Sugar | 54.5 |
| 45.5 Be' Corn Syrup | 19.6 |

-continued

| | % |
|---|---|
| Peppermint Flavor | 0.8 |
| | 100.0 |

The formula was made and sheeted as square pellets to be used as gum centers. It should be noted that the formula did not contain glycerin softeners or any other softeners. Using these pellets, two coating trials were made.

EXAMPLE 1 (Inventive)

A 1062 gram quantity of gum centers was coated with hydrated lecithin after the lecithin (a powdered lecithin, Centrolex R ™ from Central Soya Company) was hydrated in a 2:1 ratio of water to lecithin. A total of 36 grams of hydrated lecithin was coated on the pellets in three equal portions, with 7.5 grams of powdered sugar added after each portion. After this was dried, 15 grams of a 33% solution of gum arabic was coated on the pellets, and two more 7.5 gram portions of powdered sugar were added to dry the pellets. Conventional hard panning (coating) was continued with a solution composed of 600 grams of sugar, 250 grams of water, and 24 grams of gum arabic until a smooth, crunchy coating was applied at a level of 36% of the total product. The lecithin contributed about 0.75% of the total weight of the final product.

EXAMPLE 2 (Comparative)

A 1062 gram quantity of gum centers was precoated with 15 grams of a 33% solution of gum arabic and two 7.5 gram portions of powdered sugar was added to dry the centers. Conventional hard panning (coating) was continued as in Example 1 to obtain a gum product with a smooth, crunchy coating, the coating comprising 36% of the coated gum product.

A blind sensory test of the products of Example 1 versus Example 2 showed that the gum product of Example 1 was significantly softer in the intermediate and final texture than the product of Example 2. This indicates that an emulsifier applied according to this invention can soften gum for consumer preference though the gum is hard enough for hard panning.

With a level of about 0.75% of lecithin in Example 1, a slight off-taste was noted. Thus, for the gum center formulation and coating used in Example 1, a slightly lower level of lecithin is preferred. The preferred embodiment of the invention is Example 1, but with 0.5% lecithin (by weight of the total product). Other emulsifiers may be used which will not contribute to an off-taste.

EXAMPLE 3 (Inventive)

A 1062 gram quantity of gum centers can be coated with hydrated octaglycerol monooleate, hydrated in a 2:1 ratio of water to octaglycerol monooleate. A total of 36 grams of this hydrated emulsifier can be coated on the centers in three equal portions, and powdered sugar added after each portion, as in Example 1. After this is dried, 15 grams of a 33% gum arabic solution is coated on the centers and more powdered sugar is added to dry the pellets. As in Example 1, conventional hard panning techniques are then used until a smooth, crunchy coating is applied at a level of 36% of the total product.

A sensory test of the product of Example 3 versus the product of comparative Example 2 will also show a softer intermediate and final texture in the Example 3 product. However, at a usage level of 0.75%, the octaglycerol monooleate will create less of a flavor off-taste in the gum than the lecithin used in Example 1.

It should be appreciated that the compositions and methods of the present invention are capable of being incorporated in the form of a variety of embodiments, only a few of which have been illustrated and described above. For example, flavor and color ingredients may be included with other ingredients in the various coatings. The invention may be embodied in other forms without departing from its spirit or essential characteristics. The described embodiments are to be considered in all respects only as illustrative and not restrictive, and the scope of the invention is, therefore, indicated by the appended claims rather than by the foregoing description. All changes that come within the meaning and range of equivalency of the claims are to be embraced within their scope.

We claim:

1. A coated chewing gum product comprising:
   a) a chewing gum center comprising:
      i) about 5% to about 80% gum base,
      ii) about 5% to about 80% sweetening and bulking agent, and
      iii) about 0.1% to about 10% flavoring agent;
   b) a coating of an emulsifier covering the chewing gum center, and
   c) a hard panned coating covering the emulsifier coating.

2. The coated chewing gum product of claim 1 wherein the emulsifier coating comprises an emulsifier and a powdered bulk sweetener.

3. The coated chewing gum product of claim 1 further including a binder layer between the emulsifier coating and the hard-panned coating.

4. The coated chewing gum product of claim 1 wherein the hard-panned coating is comprised primarily of a sweetener selected from the group consisting of sucrose, dextrose, xylitol, sorbitol, hydrogenated isomaltulose and mixtures thereof.

5. The coated chewing gum product of claim 1 wherein the emulsifier is selected from the group consisting of lecithin; mono- and diglycerides; glyceryl lacto palmitate; sorbitan monostearate; triglycerol monostearate; triglycerol monoshortening; octaglycerol monooleate; polysorbates 65, 60 and 80; and mixtures thereof.

6. The coated chewing gum product of claim 1 wherein the emulsifier coating comprises a hydrated emulsifier.

7. The coated chewing gum product of claim 3 wherein the binder is selected from the group consisting of gum arabic, maltodextrin, dextrin, modified starch, gelatin and mixtures thereof.

8. The coated chewing gum product of claim 1 wherein the chewing gum center contains no emulsifier and the emulsifier coating comprises between about 0.05% and about 2.5% of the coated gum product and is sufficient to soften the chewing gum center during mastication of the coated chewing gum product.

9. A method of making a coated chewing gum product comprising the steps of:
   a) providing a chewing gum center comprising:
      i) about 5% to about 80% gum base,
      ii) about 5% to about 80% sweetening and bulking agent, and
      iii) about 0.1% to about 10% flavoring agent;
   b) coating said chewing gum center with an emulsifier; and
   c) hard panning said emulsifier-coated chewing gum center to form a hard panned coating.

10. The method of claim 9 wherein the step of coating the chewing gum center with an emulsifier comprises hydrating an emulsifier and applying the hydrated emulsifier to coat the chewing gum center.

11. The method of claim 10 further comprising the step of applying a powdered bulk sweetener to the hydrated emulsifier to help dry the coating of hydrated emulsifier.

12. The method of claim 11 wherein the steps of applying the hydrated emulsifier and powdered bulk sweetener are repeated one or more times.

13. The method of claim 10 wherein the emulsifier is hydrated by mixing the emulsifier with water at an emulsifier/water ratio of between about 1:3 and about 3:1 and forming a gel prior to applying the emulsifier to the chewing gum center.

14. The method of claim 10 wherein the emulsifier comprises lecithin and the ratio of water to lecithin in the hydrated emulsifier is about 2:1.

15. The method of claim 9 further comprising the step of coating the emulsifier-coated chewing gum center with a binder before the hard-panned coating is applied.

16. The method of claim 15 wherein the binder is selected from the group consisting of gum arabic, maltodextrin, dextrin, modified starch, gelatin and mixtures thereof.

17. The method of claim 9 wherein the emulsifier is selected from the group consisting of lecithin; mono- and diglycerides; glyceryl lacto palmitate; sorbitan monostearate; triglycerol monostearate; triglycerol monoshortening; octaglycerol monooleate; polysorbates 65, 60 and 80; and mixtures thereof.

18. The method of claim 15 wherein the emulsifier is applied as a hydrated emulsifier, and the binder is applied as part of a dusting mix to dry the coating of hydrated emulsifier.

19. The method of claim 9 wherein the emulsifier is coated to form a layer such that the emulsifier comprises about 0.05% to about 2.5% by weight of the coated gum product.

20. A method of making a coated chewing gum product which softens during chewing comprising the steps of:
   a) providing a chewing gum center that is sufficiently hard to undergo hard panning without significant deformation comprising:
      i) about 5% to about 80% gum base.
      ii) about 5% to about 80% sweetening and bulking agent, and
      iii) about 0.1% to about 10% flavoring agent;
   b) applying a coating of hydrated lecithin to coat the chewing gum center,
   c) applying a powdered bulk sweetener to the hydrated emulsifier coating,
   d) applying a gum arabic solution over the emulsifier coating,
   e) drying the gum arabic solution to form a binding layer, and
   f) applying a sugar syrup solution in repeated coatings, and drying the solution after each application, to form a hard sugar coating over the binding layer.

* * * * *

UNITED STATES PATENT AND TRADEMARK OFFICE
CERTIFICATE OF CORRECTION

PATENT NO. : 5,135,761
DATED : August 4, 1992
INVENTOR(S) : Jayant C. Dave et al.

It is certified that error appears in the above-identified patent and that said Letters Patent is hereby corrected as shown below:

In column 1, line 60, after "such" insert --as--.

In column 4, line 58, after "add to the" insert --softness--.

In column 5, line 14, after "(Palatinit®)" insert --*--; and insert a footnote at the end of column 5 --Registered trademark of Palatinit GmbH--.

In column 6, line 16, delete "Centrolex R TM" "and substitute therefor --Centrolex R$^{TM}$--

UNITED STATES PATENT AND TRADEMARK OFFICE
CERTIFICATE OF CORRECTION

PATENT NO. : 5,135,761
DATED : August 4, 1992
INVENTOR(S) : Jayant C. Dave et al.

It is certified that error appears in the above-identified patent and that said Letters Patent is hereby corrected as shown below:

Column 8:

In claim 20, line 52, after "base" delete "." and substitute therefor --,--.

Signed and Sealed this

Fifteenth Day of March, 1994

Attest:

BRUCE LEHMAN

Attesting Officer

Commissioner of Patents and Trademarks